United States Patent
Oda et al.

(10) Patent No.: US 8,392,079 B2
(45) Date of Patent: Mar. 5, 2013

(54) VEHICLE, CONTROL METHOD AND CONTROL APPARATUS FOR VEHICLE

(75) Inventors: Akira Oda, Nagoya (JP); Atsushi Ayabe, Toyota (JP); Tomohiro Asami, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/259,759

(22) PCT Filed: Mar. 17, 2010

(86) PCT No.: PCT/JP2010/054497
§ 371 (c)(1),
(2), (4) Date: Sep. 23, 2011

(87) PCT Pub. No.: WO2010/116870
PCT Pub. Date: Oct. 14, 2010

(65) Prior Publication Data
US 2012/0022755 A1    Jan. 26, 2012

(30) Foreign Application Priority Data
Apr. 9, 2009    (JP) ................................ 2009-095005

(51) Int. Cl.
*G06F 7/00*      (2006.01)
*G06F 17/00*    (2006.01)
*G06F 19/00*    (2011.01)

(52) U.S. Cl. ................. 701/58; 701/54; 701/64; 701/66; 477/107; 477/109; 477/110

(58) Field of Classification Search .................... 701/54, 701/58, 84, 66; 477/107, 109, 110
See application file for complete search history.

(56) References Cited

U.S. PATENT DOCUMENTS

| | | | |
|---|---|---|---|
| 7,983,826 B2 * | 7/2011 | Kuwahara et al. | 701/54 |
| 8,010,263 B2 * | 8/2011 | Morris | 701/51 |
| 8,140,230 B2 * | 3/2012 | Haggerty et al. | 701/54 |

(Continued)

FOREIGN PATENT DOCUMENTS

| | | |
|---|---|---|
| JP | 3 202646 | 9/1991 |
| JP | 10 196777 | 7/1998 |

(Continued)

OTHER PUBLICATIONS

International Search Report Issued Jun. 29, 2010 in PCT/JP10/054497 Filed Mar. 17, 2010.

Primary Examiner — Fadey Jabr
Assistant Examiner — Lail Kleinman
(74) Attorney, Agent, or Firm — Oblon, Spivak, McClelland, Maier & Neustadt, L.L.P.

(57) ABSTRACT

Damping control, by which an engine is controlled to output torque for reducing up-and-down vibrations such as pitching and bouncing of a vehicle, is performed. When the damping control is interrupted, the behavior of engine torque after the damping control is interrupted is predicted. Shift of an automatic transmission is controlled in accordance with the predicted behavior of the engine torque.

3 Claims, 17 Drawing Sheets

U.S. PATENT DOCUMENTS

| | | |
|---|---|---|
| 2003/0109357 A1* | 6/2003 | Tabata .................... 477/109 |
| 2004/0038775 A1 | 2/2004 | Shimizu et al. |
| 2004/0107034 A1* | 6/2004 | Togai et al. ................ 701/54 |
| 2005/0038576 A1* | 2/2005 | Hara et al. ................. 701/22 |
| 2006/0052908 A1 | 3/2006 | Matsumoto et al. |
| 2008/0182713 A1* | 7/2008 | Asaoka ..................... 477/49 |
| 2009/0093937 A1* | 4/2009 | Lupo et al. ................ 701/84 |
| 2011/0077835 A1* | 3/2011 | Otsuka ...................... 701/99 |
| 2012/0130608 A1* | 5/2012 | Fujii et al. ................. 701/54 |
| 2012/0179342 A1* | 7/2012 | Noumura et al. ............ 701/54 |

FOREIGN PATENT DOCUMENTS

| | | |
|---|---|---|
| JP | 2002 5203 | 1/2002 |
| JP | 2004 142472 | 5/2004 |
| JP | 2006 69472 | 3/2006 |
| JP | 2007 40476 | 2/2007 |
| JP | 2009 24638 | 2/2009 |

* cited by examiner

FIG. 3

|  | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGEMENT
× DISENGAGEMENT
◎ ENGAGEMENT AT THE TIME OF ENGINE BRAKING
△ ENGAGEMENT ONLY AT THE TIME OF DRIVING

VEHICLE, CONTROL METHOD AND CONTROL APPARATUS FOR VEHICLE

TECHNICAL FIELD

The present invention relates to a vehicle, a control method and a control apparatus for the vehicle. In particular, the present invention relates to a technique to control a transmission or a lockup clutch in accordance with the behavior of output torque of a driving source after interruption of damping control by which the driving source is controlled to output torque for reducing up-and-down vibrations (pitching and bouncing) of the vehicle.

BACKGROUND ART

Damping control by which a driving source is controlled to output torque for reducing up-and-down vibrations of a vehicle has been in practical use. In the damping control, the driving source is controlled to output torque which cancels out torque that produces the up-and-down vibrations of the vehicle.

Japanese Patent Laying-Open No. 2006-69472 (PTL 1) discloses a vehicle stability control system including: a base required drive force calculation unit that calculates a physical quantity corresponding to a base required drive force desired by a driver to generate the base required drive force at a driving wheel of a vehicle; an estimated drive force estimation unit that obtains a physical quantity corresponding to an estimated drive force that is estimated as being generated in the vehicle; and a required drive force correction unit that obtains a corrected required drive force in such a way that a pitching vibration possibly occurring in the vehicle when the estimated drive force is generated is obtained on the basis of the physical quantity corresponding to the estimated drive force, a correction to suppress the pitching vibration is obtained, and the physical quantity corresponding to the base required drive force calculated by the base required drive force calculation unit is corrected on the basis of the correction, wherein the corrected required drive force obtained by the required drive force correction unit is generated at the driving wheel.

CITATION LIST

Patent Literature

PTL 1: Japanese Patent Laying-Open No. 2006-69472

SUMMARY OF INVENTION

Technical Problem

When the driving source is disconnected from a wheel, such as during shift of a transmission, the up-and-down vibrations of the vehicle due to torque of the driving source could never be produced. Therefore, the damping control is interrupted.

After the damping control is interrupted, the driving source is controlled by a control system other than a damping control system. However, immediately after the damping control is interrupted, actual output torque differs from target torque to be realized because of a response delay in the driving source and the like. Therefore, it has been difficult to control equipment constituting a powertrain in accordance with the actual output torque of the driving source.

An object of the present invention is to control the equipment constituting the powertrain in accordance with the actual output torque of the driving source.

Solution to Problem

A vehicle includes: a driving source; a transmission coupled to the driving source and capable of changing a gear ratio by shift; and a control apparatus. The control apparatus performs damping control by which the driving source is controlled to output torque for reducing up-and-down vibrations of the vehicle, interrupts the damping control, predicts a behavior of output torque of the driving source after the damping control is interrupted, and controls the shift of the transmission based on the predicted behavior of the output torque.

A vehicle according to another embodiment includes: a driving source; a transmission coupled to the driving source with a torque converter provided with a lockup clutch being interposed therebetween; and a control apparatus. The control apparatus performs damping control by which the driving source is controlled to output torque for reducing up-and-down vibrations of the vehicle, interrupts the damping control, predicts a behavior of output torque of the driving source from when the damping control is interrupted to when the output torque of the driving source stabilizes, and controls the lockup clutch based on the predicted behavior of the output torque.

Advantageous Effects of Invention

Using the damping control, the driving source is controlled to output the torque for reducing the up-and-down vibrations of the vehicle. When the damping control is interrupted, the behavior of the output torque of the driving source from when the damping control is interrupted to when the output torque of the driving source stabilizes is predicted. Shift of the transmission or the lockup clutch is controlled based on the predicted behavior of the output torque. For example, engagement force of friction engagement elements (clutches and brakes) of the transmission is controlled in accordance with the forecasted magnitude of the output torque of the driving source. As a result, the engagement force of the friction engagement elements during the shift of the transmission can be controlled in accordance with the torque having a small difference from the actual output torque of the driving source. In addition, a start of the shift is delayed until the output torque of the driving source stabilizes. As a result, an amount of fluctuations in the output torque of the driving source (input torque of the transmission) during the shift can he decreased. Alternatively, a start of disengagement of the lockup clutch is delayed until the output torque of the driving source stabilizes. As a result, the amount of fluctuations in the output torque of the driving source (input torque of the torque converter) during transition of the lockup clutch from an engaged state to a disengaged state can be decreased. In either case, the transmission or the torque converter constituting the powertrain can be controlled in accordance with the actual output torque of the driving source.

BRIEF DESCRIPTION OF DRAWINGS

FIG. 3 is a working table of the automatic transmission.

DESCRIPTION OF EMBODIMENTS

Figure 1:
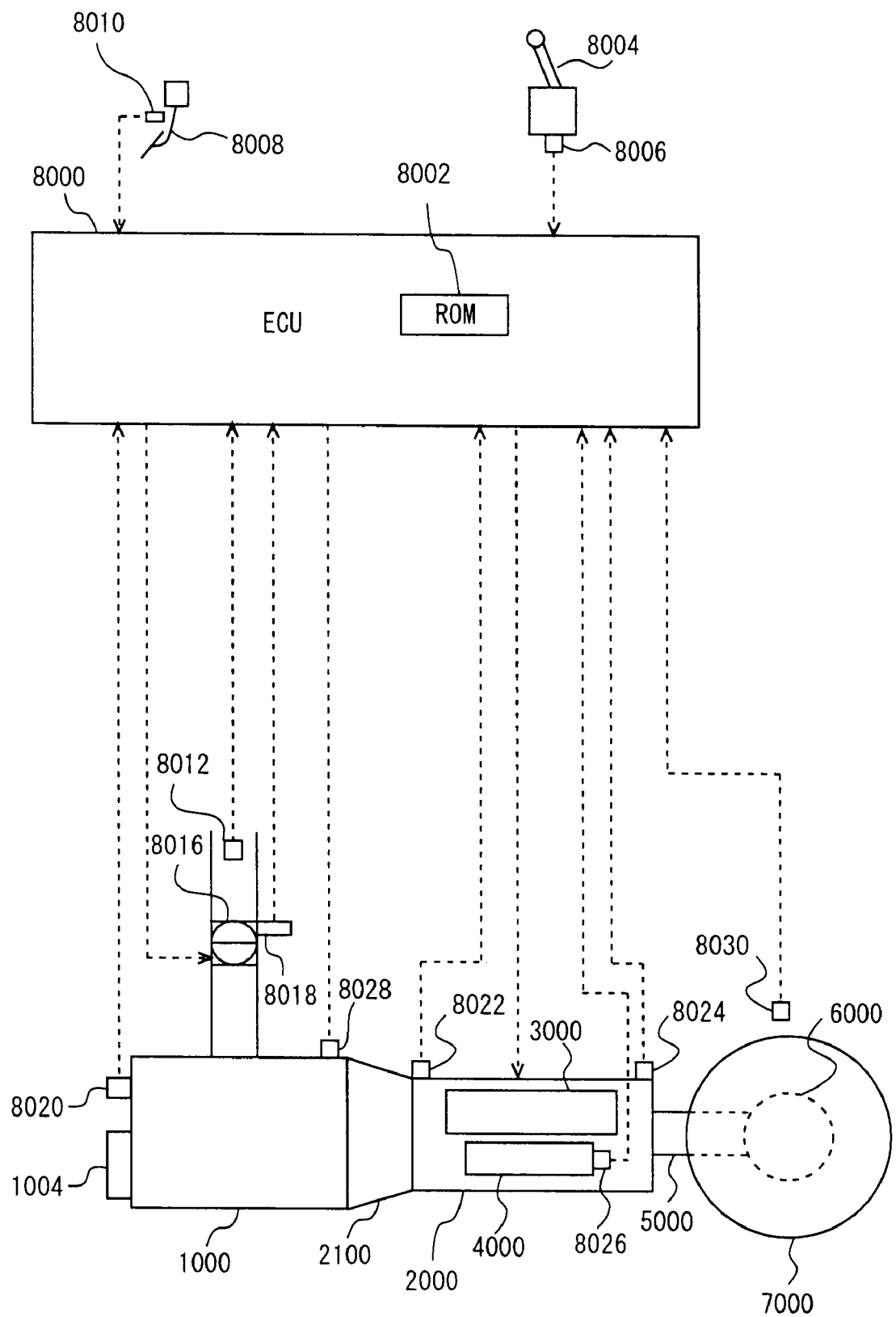
FIG. 1 is a schematic configuration diagram showing a powertrain of a vehicle.

Embodiments of the present invention will he described below with reference to the drawings. In the following description, the same parts are denoted by the same reference characters. Names and functions thereof are all the same. Therefore, a detailed description thereof will not be repeated.

First Embodiment

With reference to FIG. 1, a vehicle with a control apparatus according to a first embodiment installed will be described. This vehicle is an FR (Front engine Rear drive) vehicle. It should be noted that this vehicle may be a vehicle other than the FR vehicle.

The vehicle includes an engine 1000, an automatic transmission 2000. a torque converter 2100, a planetary gear unit 3000 constituting part of automatic transmission 2000, an oil hydraulic circuit 4000 constituting part of automatic transmission 2000, a propeller shaft 5000, a differential gear 6000. rear wheels 7000, and an ECU (Electronic Control Unit) 8000.

Engine 1000 is an internal combustion engine for combusting an air-fuel mixture of fuel injected from an injector (not shown) and the air in a combustion chamber of a cylinder. A piston in the cylinder is pushed down by the combustion and a crankshaft is rotated. An auxiliary machine 1004 such as an alternator and an air conditioner is driven by engine 1000. Output torque of engine 1000 (engine torque TE) is changed in accordance with an actuated amount of an electronic throttle valve 8016, that is. a throttle opening position or the like. It should be noted that a motor may be used as a driving source instead of or in addition to engine 1000. Alternatively, a diesel engine may be used. In the diesel engine, output torque is changed in accordance with the valve opening time of the injector (the actuated amount), that is, a fuel injection amount.

Automatic transmission 2000 is coupled to engine 1000 with torque converter 2100 interposed therebetween. Automatic transmission 2000 implements a desired gear so as to shift the rotation speed of the crankshaft to a desired rotation speed. It should be noted that a CVT (Continuously Variable Transmission) for continuously changing a gear ratio may be installed instead of the automatic transmission implementing a gear. Further, another automatic transmission configured by a constant-meshing type gear shifted by an oil hydraulic actuator or an electric motor may he installed.

Drive force outputted from automatic transmission 2000 is transmitted to right and left rear wheels 7000 through propeller shaft 5000 and differential gear 6000.

A position switch 8006 of a shift lever 8004, an accelerator pedal position sensor 8010 of an accelerator pedal 8008, an air flow meter 8012, a throttle opening position sensor 8018 of electronic throttle valve 8016. an engine rotation speed sensor 8020, an input shaft rotation speed sensor 8022, an output shaft rotation speed sensor 8024. an oil temperature sensor 8026. a water temperature sensor 8028, and a wheel speed sensor 8030 are connected to ECU 8000 with a harness and the like interposed therebetween.

A position of shift lever 8004 is detected by position switch 8006, and a signal representing a detection result is transmitted to ECU 8000. The gear of automatic transmission 2000 is automatically implemented in response to the position of shift lever 8004. A driver may select a manual shift mode in which the driver can select any gear in accordance with operations of the driver.

Accelerator pedal position sensor 8010 detects a position of accelerator pedal 8008 and transmits a signal representing a detection result to ECU 8000. Air flow meter 8012 detects an amount of air to be taken in engine 1000 and transmits a signal representing a detection result to ECU 8000.

Throttle opening position sensor 8018 detects an opening position of electronic throttle valve 8016 adjusted by an actuator and transmits a signal representing a detection result to ECU 8000. The amount of air to be taken in engine 1000 is adjusted by electronic throttle valve 8016.

It should be noted that the amount of air to he taken in engine 1000 may he adjusted by a variable valve lift system that changes the lift amount or opening/closing phase of an inlet valve (not shown) or an outlet valve (not shown), instead of or in addition to electronic throttle valve 8016.

Engine rotation speed sensor 8020 detects the rotation speed of an output shaft (crankshaft) of engine 1000 (hereinafter, also referred to as engine rotation speed NE) and transmits a signal representing a detection result to ECU 8000. Input shaft rotation speed sensor 8022 detects an input shaft rotation speed NI of automatic transmission 2000 (a turbine rotation speed NT of torque converter 2100) and transmits a signal representing a detection result to ECU 8000. Output shaft rotation speed sensor 8024 detects an output shaft rotation speed NO of automatic transmission 2000 and transmits a signal representing a detection result to ECU 8000.

Oil temperature sensor 8026 detects a temperature (an oil temperature) of oil used for actuating and lubricating automatic transmission 2000 (ATF: Automatic Transmission Fluid) and transmits a signal representing a detection result to ECU 8000.

Water temperature sensor 8028 detects a temperature (a water temperature) of coolant of engine 1000 and transmits a signal representing a detection result to ECU 8000.

Wheel speed sensors 8030 are provided for two front wheels and two rear wheels 7000, respectively. In other words, wheel speed sensors 8030 are provided for the four wheels, respectively. Wheel speed sensor 8030 detects the rotation speed of each wheel and transmits a signal representing a detection result to ECU 8000.

ECU 8000 controls devices such that the vehicle is in a desired traveling state, based on the signals transmitted from position switch 8006, accelerator pedal position sensor 8010, air flow meter 8012, throttle opening position sensor 8018, engine rotation speed sensor 8020, input shaft rotation speed sensor 8022, output shaft rotation speed sensor 8024. oil temperature sensor 8026. water temperature sensor 8028, wheel speed sensor 8030, and the like, a map and a program stored in a ROM (Read Only Memory) 8002. It should be noted that the program to he executed by ECU 8000 may be recorded in a recording medium such as a CD (Compact Disc) and a DVD (Digital Versatile Disc) and distributed on the market.

In the present embodiment. ECU 8000 controls automatic transmission 2000 such that any of first to eighth forward gears is implemented in the case where a D (drive) range is selected as a shift range of automatic transmission 2000 by placing shift lever 8004 at a D (drive) position. Since any gear among the first to eighth forward gears is implemented. automatic transmission 2000 can transmit the drive force to rear wheels 7000. It should be noted that a gear of a higher speed than the eighth gear may be implemented in the D range.

Figure 2:
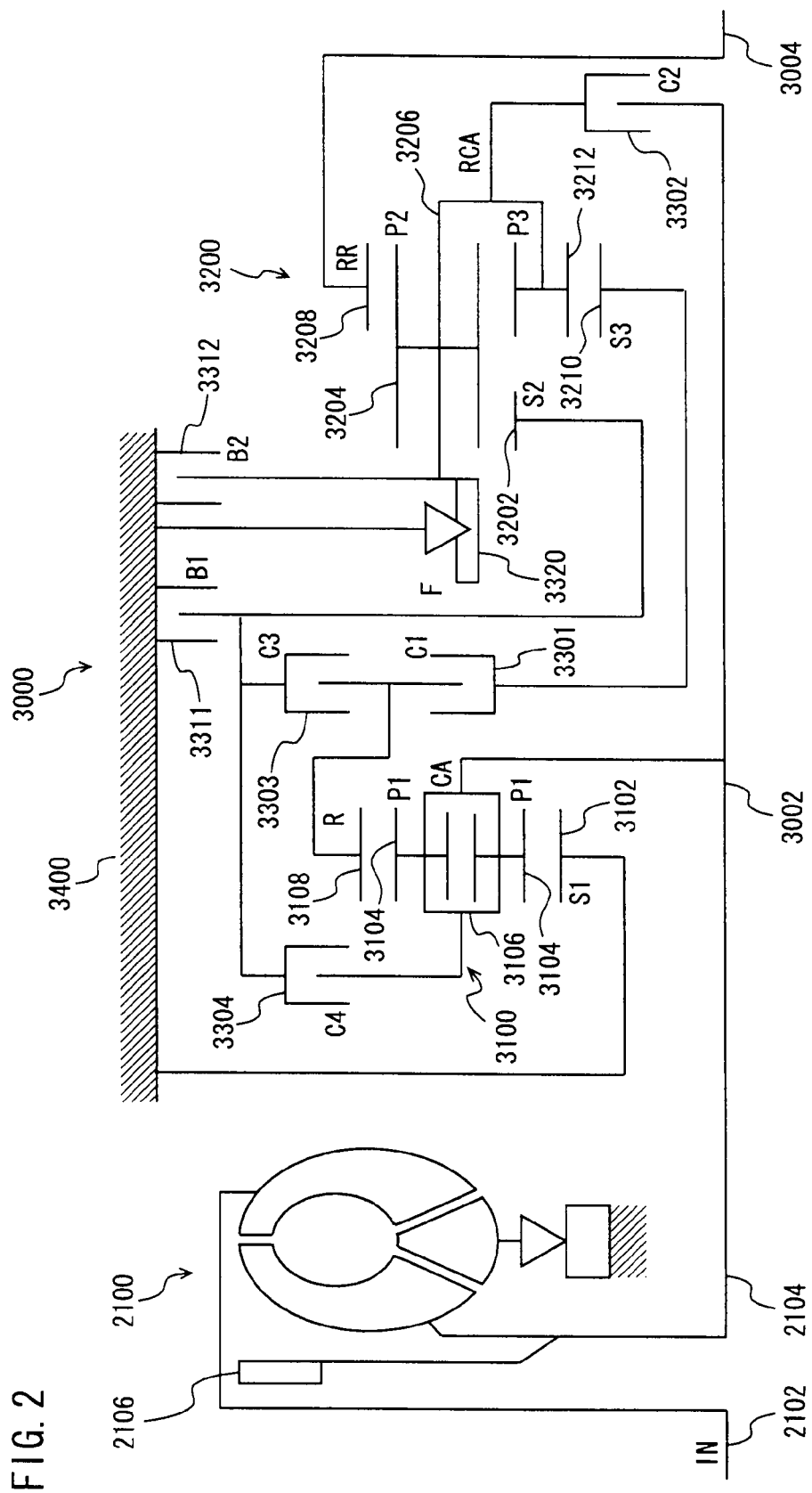
FIG. 2 is a skeleton diagram showing a planetary gear unit of an automatic transmission.

With reference to FIG. 2. planetary gear unit 3000 will be described. Planetary gear unit 3000 is connected to torque converter 2100 having an input shaft 2102 coupled to the crankshaft and a lockup clutch 2106 capable of directly coupling input shaft 2102 and an output shaft 2104.

Planetary gear unit 3000 includes a front planetary 3100, a rear planetary 3200, a C1 clutch 3301. a C2 clutch 3302. a C3 clutch 3303, a C4 clutch 3304. a B1 brake 3311. a B2 brake 3312. and a one-way clutch (F) 3320.

Front planetary 3100 is a planetary gear mechanism of a double pinion type. Front planetary 3100 includes a first sun gear (S1) 3102, a pair of first pinion gears (P1) 3104. a carrier (CA) 3106, and a ring gear (R) 3108.

First pinion gears (P1) 3104 are meshed with first sun gear (S1) 3102 and first ring gear (R) 3108. First carrier (CA) 3106 supports first pinion gears (P1) 3104 such that first pinion gears (P1) 3104 can be rotated around an outer axis and also around their own axes.

First sun gear (S1) 3102 is fixed to a gear case 3400 so as not to rotate. First carrier (CA) 3106 is coupled to an input shaft 3002 of planetary gear unit 3000.

Rear planetary 3200 is a Ravigneaux type planetary gear mechanism. Rear planetary 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

Second pinion gear (P2) 3204 is meshed with second sun gear (S2) 3202, rear ring gear (RR) 3208 and third pinion gear (P3) 3212. Third pinion gear (P3) 3212 is meshed with third sun gear (S3) 3210 in addition to second pinion gear (P2) 3204.

Rear carrier (RCA) 3206 supports second pinion gear (P2) 3204 and third pinion gear (P3) 3212 such that second pinion gear (P2) 3204 and third pinion gear (P3) 3212 can be rotated around an outer axis and also around their own axes. Rear carrier (RCA) 3206 is coupled to one-way clutch (F) 3320. Rear carrier (RCA) 3206 cannot be rotated at the time of driving in the first gear (when the vehicle travels by using drive force outputted from engine 1000). Rear ring gear (RR) 3208 is coupled to an output shaft 3004 of planetary gear unit 3000.

One-way clutch (F) 3320 is provided in parallel to B2 brake 3312. That is, an outer race of one-way clutch (F) 3320 is fixed to gear case 3400, and an inner race is coupled to rear carrier (RCA) 3206.

FIG. 3 shows a working table illustrating a relationship between the shift gears and working states of the clutches and the brakes. First to eighth forward gears and first and second reverse gears are implemented by actuating the brakes and the clutches in combinations shown in this working table.

Figure 4:
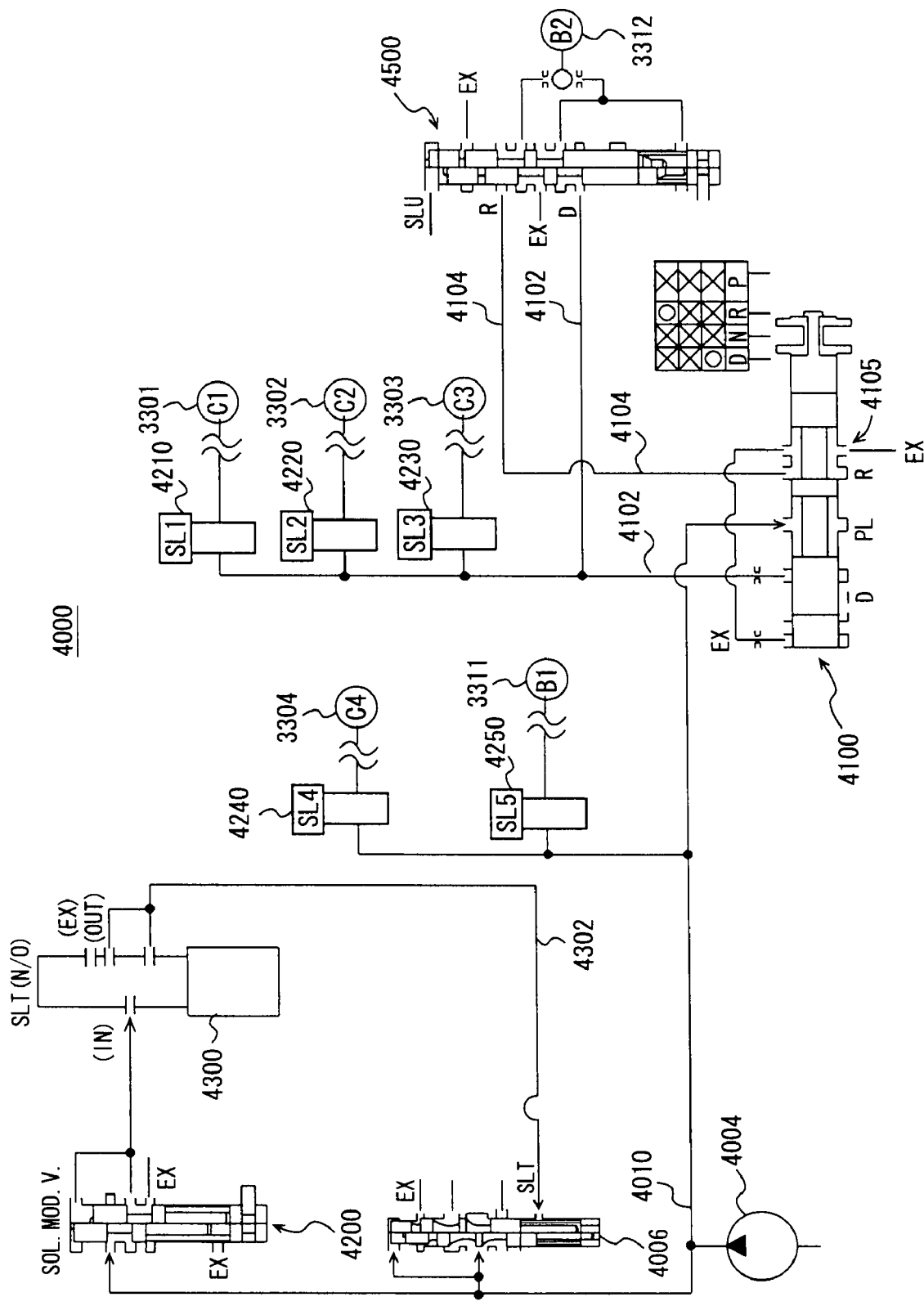
FIG. 4 is a diagram showing an oil hydraulic circuit of the automatic transmission.

With reference to FIG. 4, a principal portion of oil hydraulic circuit 4000 will be described. It should be noted that oil hydraulic circuit 4000 is not limited to the one described below.

Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220. an SL3 linear solenoid (hereinafter, indicated as SL (3)) 4230, an SL4 linear solenoid (hereinafter, indicated as SL (4)) 4240. an SL5 linear solenoid (hereinafter, indicated as SL (5)) 4250, an SLT linear solenoid (hereinafter, indicated as SLT) 4300. and a B2 control valve 4500.

Oil pump 4004 is coupled to the crankshaft of engine 1000. Oil pump 4004 is driven by rotation of the crankshaft so as to generate oil pressure. The oil pressure generated in oil pump 4004 is regulated by primary regulator valve 4006 so as to generate line pressure.

Primary regulator valve 4006 is actuated taking throttle pressure regulated by SLT 4300 as pilot pressure. The line pressure is supplied to manual valve 4100 through a line pressure oil channel 4010.

Manual valve 4100 includes a drain port 4105. The oil pressure of a D range pressure oil channel 4102 and an R range pressure oil channel 4104 is discharged from drain port 4105. In the case where a spool of manual valve 4100 is at a D position, line pressure oil channel 4010 communicates with D range pressure oil channel 4102. Therefore, the oil pressure is supplied to D range pressure oil channel 4102. At this point, R range pressure oil channel 4104 communicates with drain port 4105. Therefore. R range pressure of R range pressure oil channel 4104 is discharged from drain port 4105.

In the case where the spool of manual valve 4100 is at an R position, line pressure oil channel 4010 communicates with R range pressure oil channel 4104. Therefore, the oil pressure is supplied to R range pressure oil channel 4104. At this point. D range pressure oil channel 4102 communicates with drain port 4105. Therefore. D range pressure of D range pressure oil channel 4102 is discharged from drain port 4105.

In the case where the spool of manual valve 4100 is at an N position. both D range pressure oil channel 4102 and R range pressure oil channel 4104 communicate with drain port 4105. Therefore, the D range pressure of D range pressure oil channel 4102 and the R range pressure of R range pressure oil channel 4104 are discharged from drain port 4105.

The oil pressure supplied to D range pressure oil channel 4102 is eventually supplied to C1 clutch 3301. C2 clutch 3302 and C3 clutch 3303. The oil pressure supplied to R range pressure oil channel 4104 is eventually supplied to B2 brake 3312.

Solenoid modulator valve 4200 regulates the oil pressure to be supplied to SLT 4300 (solenoid modulator pressure) to a constant level taking the line pressure as base pressure.

SL (1) 4210 regulates the oil pressure supplied to C1 clutch 3301. SL (2) 4220 regulates the oil pressure supplied to C2 clutch 3302. SL (3) 4230 regulates the oil pressure supplied to C3 clutch 3303. SL (4) 4240 regulates the oil pressure supplied to C4 clutch 3304. SL (5) 4250 regulates the oil pressure supplied to B1 brake 3311.

SLT 4300 regulates the solenoid modulator pressure in accordance with a control signal from ECU 8000 based on the accelerator pedal position detected by accelerator pedal position sensor 8010 so as to generate the throttle pressure. The throttle pressure is supplied to primary regulator valve 4006 through an SLT oil channel 4302. The throttle pressure is used as the pilot pressure of primary regulator valve 4006.

SL (1) 4210, SL (2) 4220, SL (3) 4230. SL (4) 4240, SL (5) 4250, and SLT 4300 are controlled by the control signal sent from ECU 8000.

B2 control valve 4500 selectively supplies the oil pressure from one of D range pressure oil channel 4102 and R range pressure oil channel 4104 to B2 brake 3312. D range pressure oil channel 4102 and R range pressure oil channel 4104 are connected to B2 control valve 4500. B2 control valve 4500 is controlled by the oil pressure supplied from an SLU solenoid valve (not shown) and the biasing force of a spring.

In the case where the SLU solenoid valve is ON, B2 control valve 4500 attains the left side state of FIG. 4. In this case. B2 brake 3312 is supplied with oil pressure obtained by regulating the D range pressure taking the oil pressure supplied from the SLU solenoid valve as the pilot pressure.

In the case where the SLU solenoid valve is OFF. B2 control valve 4500 attains the right side state of FIG. 4. In this case, B2 brake 3312 is supplied with the R range pressure.

Figure 5:
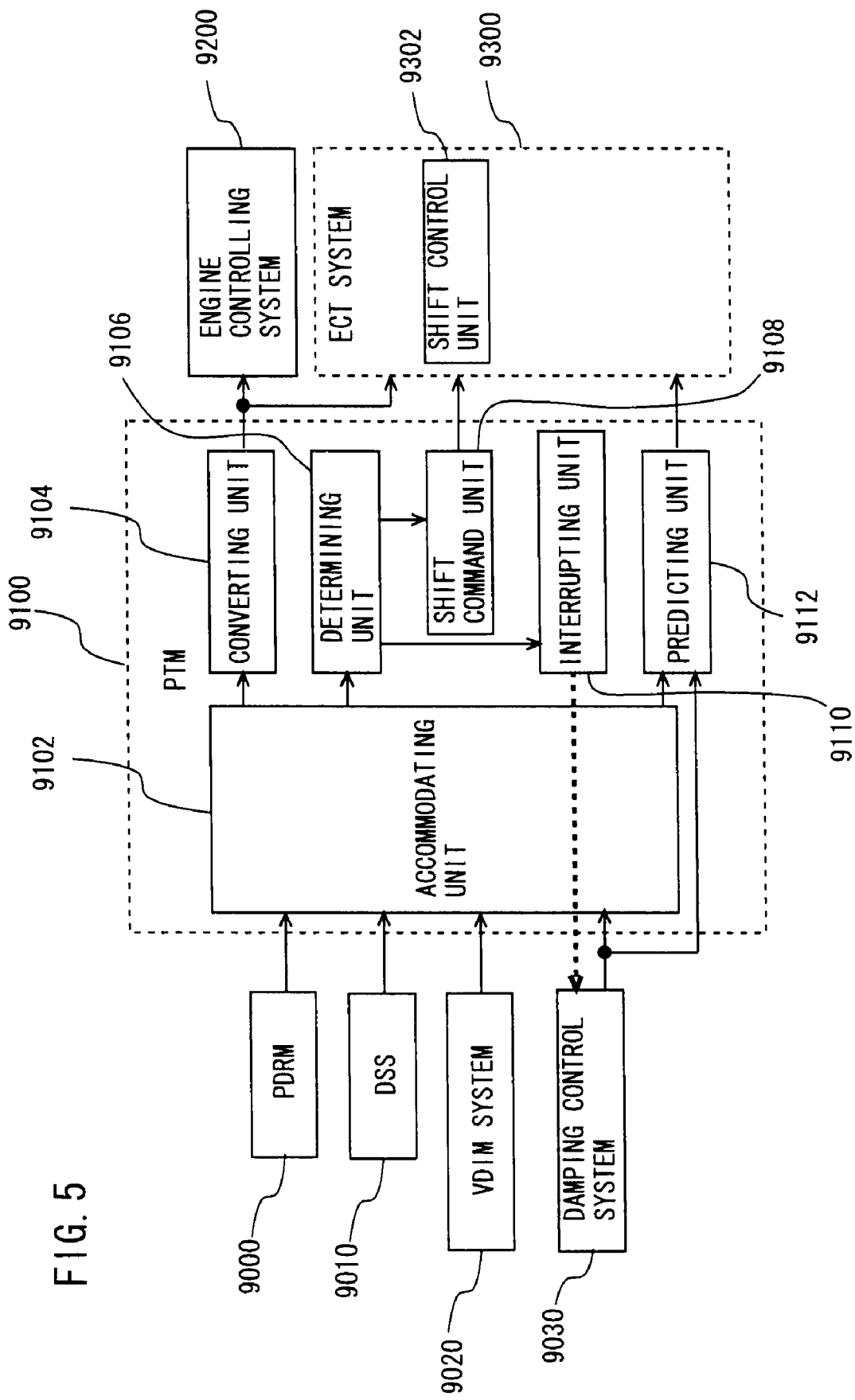
FIG. 5 is a diagram showing a configuration of a control system in a first embodiment.

With reference to FIG. 5, a control system implemented in ECU 8000 will be described. As shown in FIG. 5, in ECU 8000, a power train driver model (PDRM) 9000, a drivers support system (DSS) 9010, a VDIM (Vehicle Dynamics Integrated Management) system 9020, a damping control system 9030, a power train manager (PTM) 9100. an engine controlling system 9200, and an ECT (Electronic Controlled Transmission) system 9300 are implemented. It should be noted that these control systems may be implemented separately in a plurality of ECUs.

Power train driver model 9000 is a model (a function) used for setting demand drive force relative to the vehicle (demand engine torque relative to engine 1000) based on the operations of the driver.

In the present embodiment, the demand drive force (a demand value of output torque of engine 1000) is set from the accelerator pedal position, the vehicle speed and the like in accordance with a map predetermined based on results of an experiment, a simulation. and the like. It should be noted that a method of setting the demand drive force based on the operations of the driver is not limited thereto.

Drivers support system 9010 automatically sets the demand drive force in accordance with the behavior of the vehicle by a cruise control system, a parking, assist system, a pre-crash safety system, and the like.

The cruise control system is a system of maintaining the vehicle speed set by the driver. The parking assist system is a system of allowing fully-automatic or partially-automatic parking at a position set by the driver. For example, the steering operation and the vehicle speed control for parking the vehicle at the position set by the driver is performed automatically. The pre-crash safety system is a system of preventing a vehicle crash. For example, when the vehicle comes close to a vehicle running ahead, the vehicle speed is controlled to be reduced.

Drivers support system 9010 automatically sets the demand drive force required to perform these control, based on a map and the like preliminarily prepared by a designer.

VDIM system 9020 is a system for integrating VSC (Vehicle Stability Control), TRC (TRaction Control), ABS (Anti lock Brake System). EPS (Electric Power Steering), and the like. VDIM system 9020 calculates a difference between a traveling image of the driver with regard to an amount of operation of an accelerator, steering and a brake and a vehicle behavior with regard to various sensor information, and controls the drive force of the vehicle, braking oil pressure, or the like so as to reduce the difference.

The VSC is control of automatically setting an optimal value of the braking oil pressure of wheels, the demand drive force, and the like so as to ensure stability of the vehicle in the case where a sensor detects a state in which front and rear wheels are likely to skid.

The TRC is control of automatically setting an optimal value of the braking oil pressure of the wheels, the demand drive force of engine 1000, and the like so as to ensure optimal drive force when a sensor detects a skid of drive wheels at the time of starting and accelerating the vehicle on a slippery road surface.

The ABS is a control system of automatically setting an optimal value of the braking oil pressure so as to prevent locking of the wheels. The EPS is a control system of assisting steering of a steering wheel by force of an electric motor.

Damping control system 9030 performs damping control by which engine 1000 is controlled to output torque for reducing up-and-down vibrations such as pitching and bouncing of the vehicle. The damping control is performed when lockup clutch 2106 is engaged.

Damping control system 9030 sets the demand drive force for suppressing pitching and bouncing of the vehicle calculated using a vehicle model from actual drive force of the vehicle or the like. A conventional technique may be used for a method of setting the demand drive force for suppressing the pitching and bouncing of the vehicle. Therefore, a further detailed description will not he repeated here.

An accommodating unit 9102 of power train manager 9100 accommodates the demand drive force demanded by power train driver model 9000, drivers support system 9010, VDIM system 9020, and damping control system 9030, and sets target drive force of the vehicle.

For example, power train manager 9100 sets, as the target drive force, the drive force obtained by adding the demand drive force demanded by power train driver model 9000, drivers support system 9010, VDIM system 9020, and damping control system 9030.

In addition, the maximum demand drive force or the minimum demand drive force is determined as the demand drive force used for controlling engine 1000, depending on an operation state of the vehicle. When a predetermined condition is satisfied, the demand drive force demanded by a particular system among power train driver model 9000, drivers support system 9010, VDIM system 9020, and damping control system 9030 is determined as the target drive force. It should be noted that a method of accommodating the demand drive force is not limited thereto.

In a converting unit 9104, the set target drive force is converted into target engine torque (a target value of the output torque) of engine 1000 by, for example, multiplying the target drive force by the radius of rear wheels 7000 and dividing the same by the gear ratios of automatic transmission 2000 and differential gear 6000.

The obtained target engine torque is inputted to engine controlling system 9200 and ECT system 9300.

Furthermore, a determining unit 9106 of power train manager 9100 determines whether or not to perform shift of automatic transmission 2000. For example, a gear of automatic transmission 2000 is determined in accordance with a shift map having the accelerator pedal position, the vehicle speed, the target drive force and the like as parameters, and it is determined whether or not to perform shift to the determined gear. It should be noted that a method of determining whether or not to perform the shift is not limited thereto.

When it is determined to perform the shift of automatic transmission 2000, a signal for commanding shift is outputted from a shift command unit 9108 to ECT system 9300.

In addition, when it is determined to perform the shift of automatic transmission 2000, the damping control is interrupted by an interrupting unit 9110 of power train manager 9100.

Figure 6:
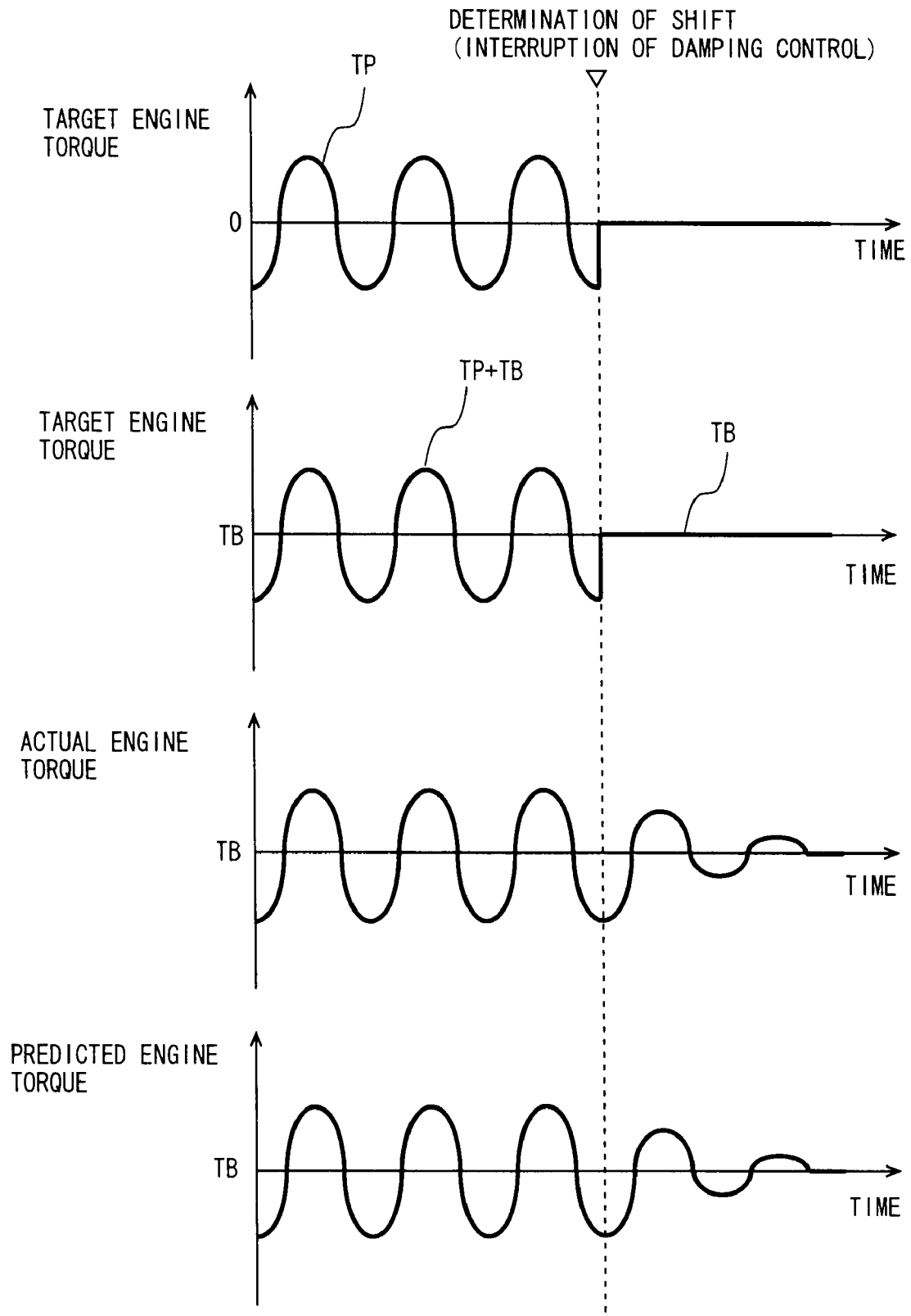
FIG. 6 is a diagram showing target engine torque, actual engine torque and predicted engine torque.

Therefore, as shown in FIG. 6, the target drive force is set based on the demand drive force demanded by the other systems, without consideration of the demand drive force demanded by damping control system 9030. In FIG. 6, "TP" indicates the target engine torque set based on the demand drive force demanded by damping control system 9030. "TB" indicates the target engine torque set based on the demand drive force demanded by the systems other than damping control system 9030.

Even if the target engine torque changes in a stepwise manner as a result of interruption of the damping control, the target engine torque may differ from the actual engine torque immediately after the damping control system is interrupted as shown in FIG. 6.

Thus, a predicting unit 9112 predicts the behavior of the engine torque after the damping control is interrupted.

More specifically. the magnitude of the engine torque from when the damping control is interrupted to when the actual engine torque stabilizes as well as the manner of change thereof are predicted based on the amplitude and the phase of the target engine torque controlled by the damping control at the time of interrupting the damping control.

Here, the phase of the target engine torque controlled by the damping control at the time of interrupting the damping control means a time when the periodically-changing target engine torque is interrupted. Therefore, the phase of the target engine torque means substantially the same as the tendency of change in the target engine torque.

The magnitude of the engine torque from when the damping control is interrupted to when the actual engine torque stabilizes as well as the manner of change thereof are calculated using a function, a map or the like preliminarily prepared by a developer based on results of an experiment, a simulation and the like. It should be noted that a method of predicting the magnitude of the engine torque from when the damping control is interrupted to when the actual engine torque stabilizes as well as the manner of change thereof is not limited thereto.

Returning to FIG. 5, ECT system 9300 controls automatic transmission 2000 and lockup clutch 2106.

In the present embodiment, upon receiving the signal for commanding shift from shift command unit 9108 of power train manager 9100, a shift control unit 9302 of ECT system 9300 performs control to start the shift of automatic transmission 2000. In other words, automatic transmission 2000 is controlled to implement the gear determined by power train manager 9100.

In addition, ECT system 9300 controls the shift of automatic transmission 2000 based on the behavior of the engine torque predicted by power train manager 9100.

In the present embodiment, transient engagement force of friction engagement elements (clutches and brakes) during the shift of automatic transmission 2000 is controlled in accordance with the predicted magnitude of the engine torque.

Figure 7:
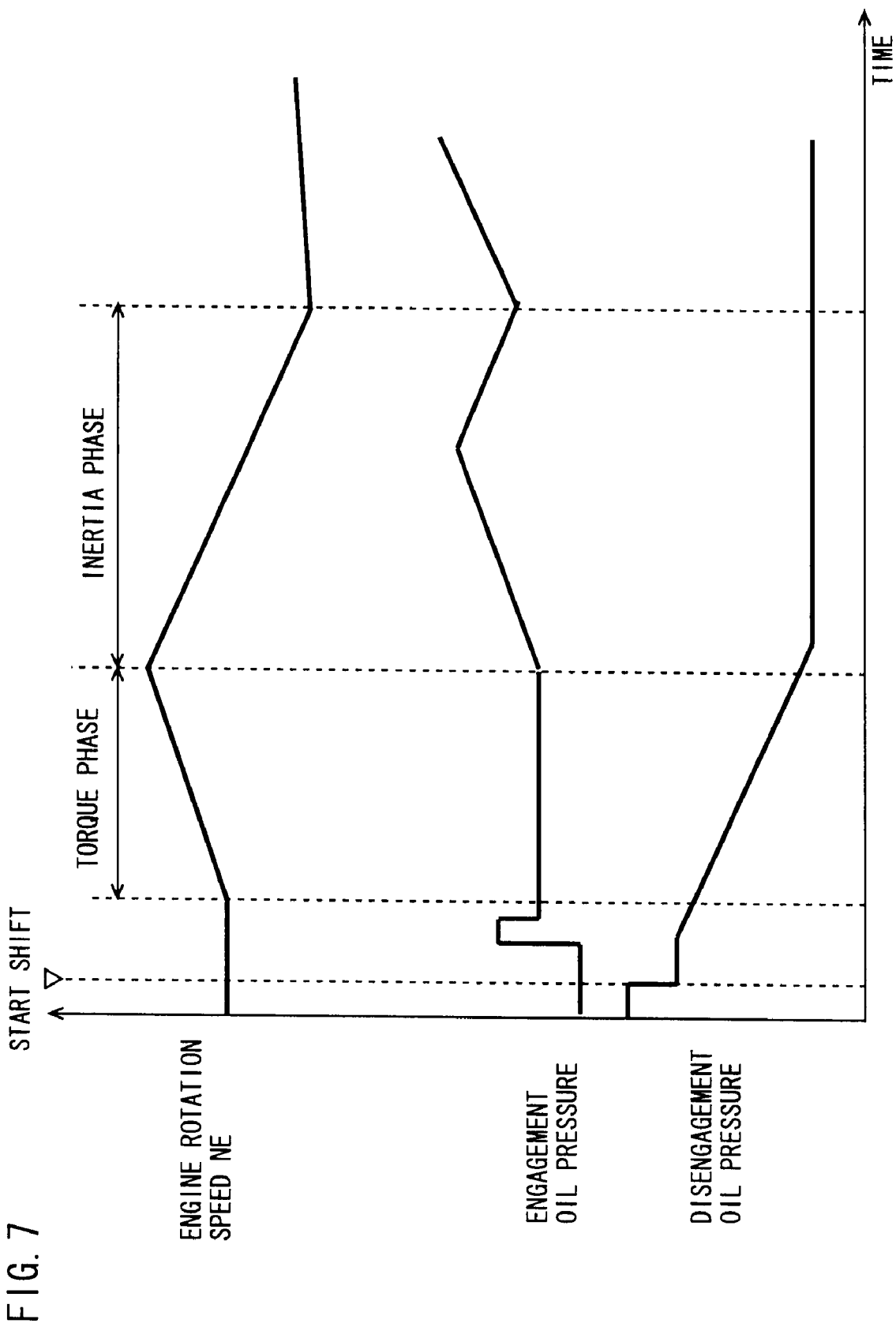
FIG. 7 is a graph showing engagement oil pressure and disengagement oil pressure during shift.

For example, as shown in FIG. 7, the magnitude and the manner of change of at least one of the oil pressure supplied to the friction engagement elements that are brought from the engaged state to the disengaged state as a result of the shift (hereinafter, also referred to as "disengagement oil pressure") and the oil pressure supplied to the friction engagement elements that are brought from the disengaged state to the engaged state as a result of the shift (hereinafter, also referred to as "engagement oil pressure") are controlled in accordance with the predicted magnitude of the engine torque.

For example, control is performed such that the larger the predicted engine torque is, the larger the engagement force of the friction engagement elements during the shift, that is, the torque capacity is. It should be noted that a method of controlling the engagement force is not limited thereto.

It should be noted that ECT system 9300 may predict the behavior of the engine torque after the damping control is interrupted.

Figure 8:
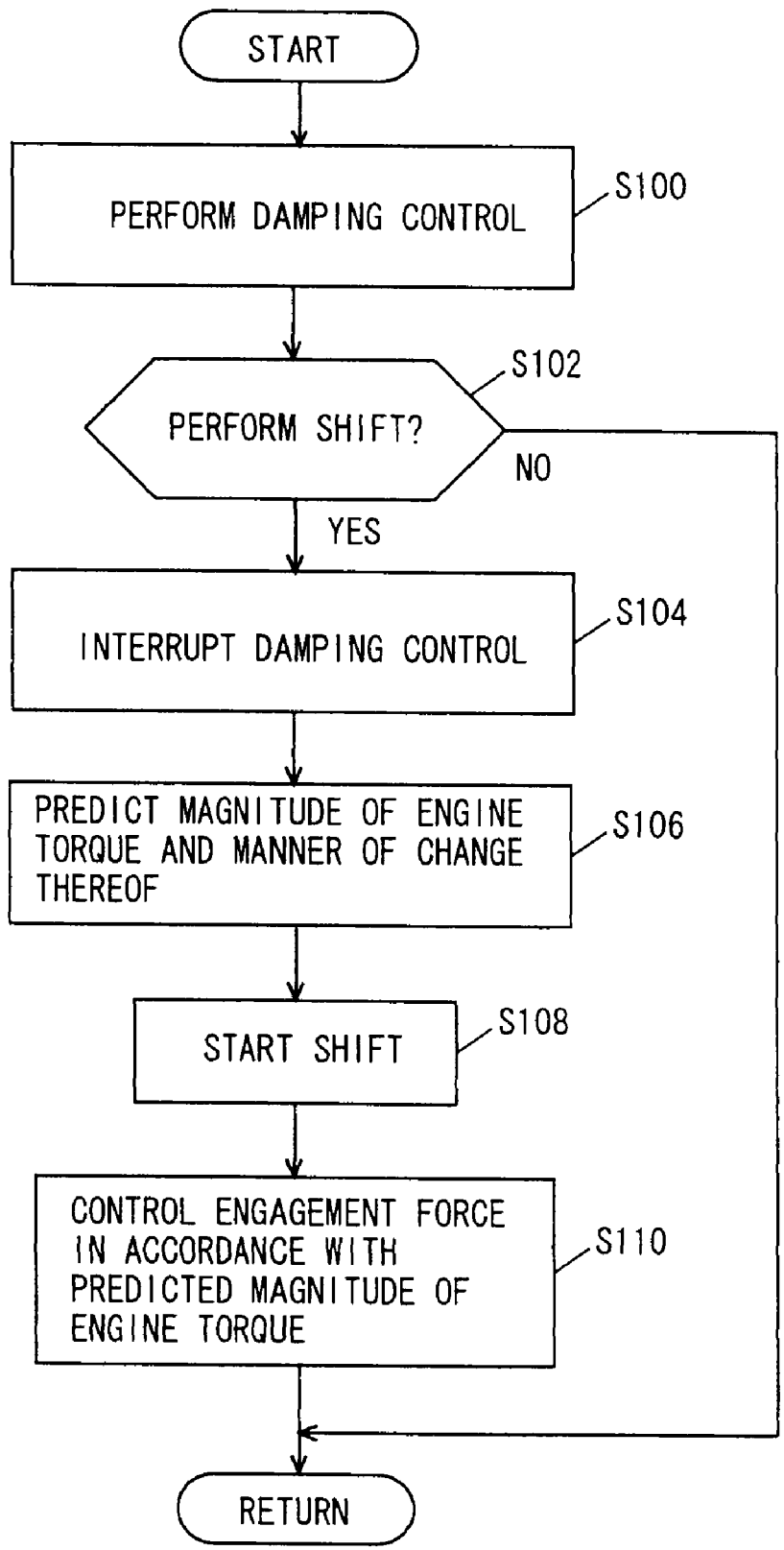
FIG. 8 is a diagram showing a control structure of a program executed by an ECU in the first embodiment.

With reference to FIG. 8, a control structure of a program executed by ECU 8000 will be described.

In step (hereinafter, abbreviated as "S") 100, ECU 8000 performs the damping control.

In S102, it is determined whether or not to perform shift of automatic transmission 2000. If the shift is performed (YES in S102), the processing proceeds to S104. If not (NO in S102), the processing returns to S100. In S104, ECU 8000 interrupts the damping control.

In S106, ECU 8000 predicts the magnitude of the engine torque from when the damping control is interrupted to when the actual engine torque stabilizes as well as the manner of change thereof, based on the amplitude and the phase of the target engine torque controlled by the damping control at the time of interrupting the damping control.

In S108, ECU 8000 starts the shift of automatic transmission 2000. In S110, ECU 8000 controls the transient engagement force of the friction engagement elements (clutches and brakes) during the shift of automatic transmission 2000, in accordance with the predicted magnitude of the engine torque.

The operation of the control system in the present embodiment based on the above structure and flowchart will be described.

While the vehicle is running, the damping control is performed to reduce pitching and bouncing (S100). During the shift of automatic transmission 2000, however, the engagement force of the friction engagement elements in automatic transmission 2000 changes, and thus, it becomes difficult to transmit the torque for reducing pitching and bouncing to the wheels.

Thus, when the shift is performed (YES in S102), the damping control is interrupted (S104). Thereafter, the magnitude of the engine torque from when the damping control is interrupted to when the actual engine torque stabilizes as well as the manner of change thereof is predicted based on the amplitude and the phase of the target engine torque controlled by the damping control at the time of interrupting the damping control (S106).

When the shift of automatic transmission 2000 starts (S108), the transient engagement force of the friction engagement elements (clutches and brakes) during the shift of automatic transmission 2000 is controlled in accordance with the predicted magnitude of the engine torque (S110).

As a result, the engagement force of the friction engagement elements during the shift can be controlled using the torque having a small difference from the actual engine torque. Therefore, the engagement force of the friction engagement force can be neither overmuch nor insufficient with respect to the actual engine torque, that is, the torque actually inputted to automatic transmission 2000. Consequently, automatic transmission 2000 constituting the powertrain can be controlled in accordance with the actual engine torque.

It should be noted that instead of power train manager 9100 or ECT system 9300, damping control system 9030 may predict the behavior of the actual engine torque from when the damping control is interrupted to when the actual engine torque stabilizes.

Figure 9:
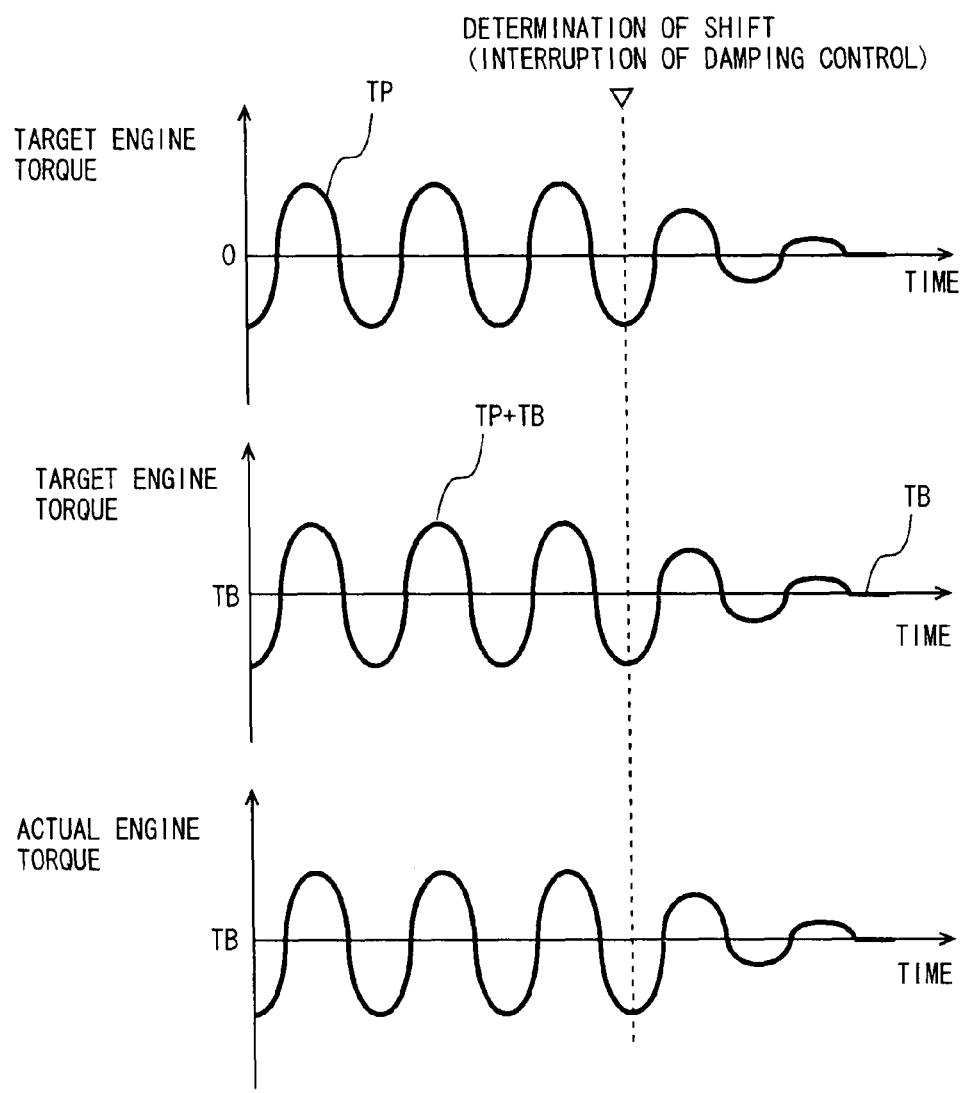
FIG. 9 is a diagram showing the target engine torque and the actual engine torque.

More specifically, as shown in FIG. 9, damping control system 9030 may set the demand drive force such that the target engine torque is gradually attenuated after the damping control is interrupted and the shift starts, whereby the behavior of the actual engine torque may be predicted.

With this, automatic transmission 2000 can be controlled based on the engine torque predicted by ECT system 9300, without providing an interface designed specifically for communicating the predicted engine torque among power train manager 9100, damping control system 9030 and ECT system 9300.

Second Embodiment

A second embodiment will be described hereinafter. The present embodiment is different from the above-described first embodiment in that the start of the shift of automatic transmission 2000 is delayed until the engine torque stabilizes after the damping control is interrupted. In addition, the present embodiment is different from the above-described first embodiment in that the start of disengagement of lockup clutch 2106 is delayed until the engine torque stabilizes after the damping control is interrupted.

The remaining configuration is the same as that of the above-described first embodiment, and thus, detailed description thereof will not be repeated here.

Figure 10:
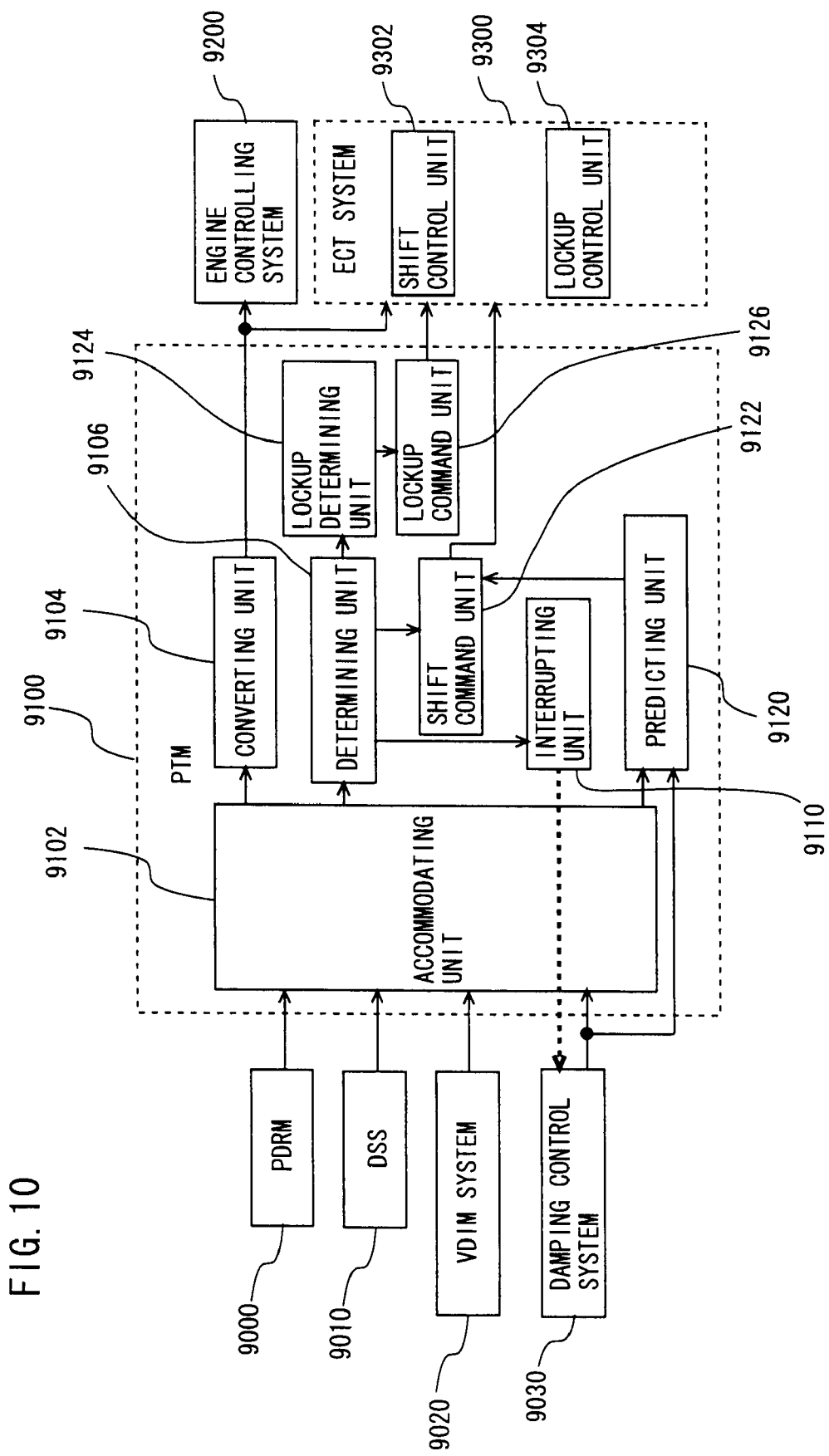
FIG. 10 is a diagram showing a configuration of a control system in a second embodiment.

Referring to FIG. 10, a predicting unit 9120 of power train manager 9100 predicts a time when the actual engine torque stabilizes after the damping control is interrupted, as the behavior of the engine torque after the damping control is interrupted.

Figure 11:
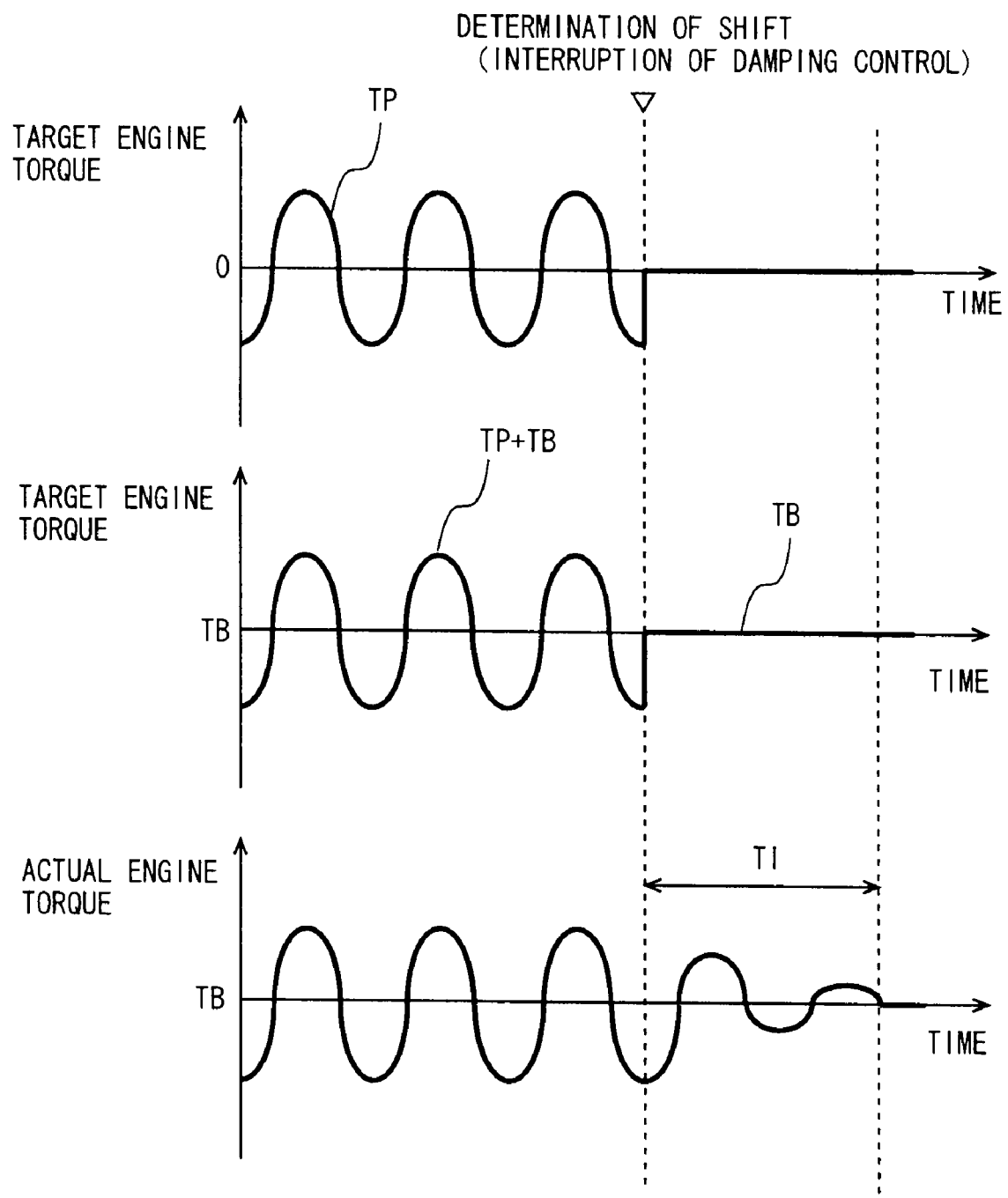
FIG. 11 is a diagram showing time TI from when damping control is interrupted to when the actual engine torque stabilizes.

More specifically, predicting unit 9120 predicts the time when the actual engine torque stabilizes after the damping control is interrupted, based on the amplitude and the phase of the target engine torque controlled by the damping control at the time of interrupting the damping control. In other words, as shown in FIG. 11, time TI from when the damping control is interrupted to when the actual engine torque stabilizes is predicted.

Time TI from when the damping control is interrupted to when the actual engine torque stabilizes is calculated using a function, a map or the like preliminarily prepared by a developer based on results of an experiment, a simulation and the like. It should be noted that a method of predicting time TI from when the damping control is interrupted to when the actual engine torque stabilizes is not limited thereto.

Figure 12:
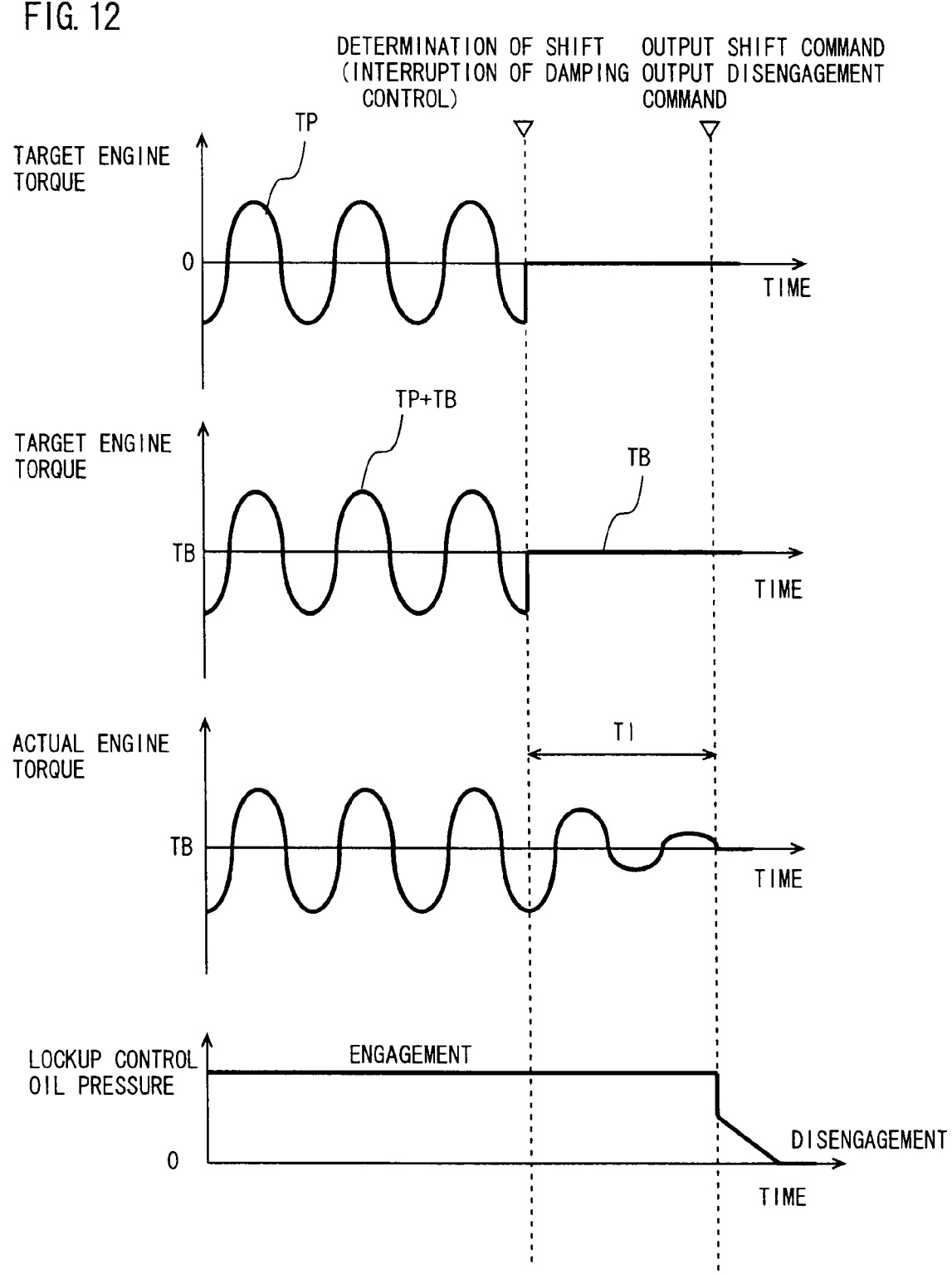
FIG. 12 is a diagram showing a time when a signal for commanding shift and a signal for commanding disengagement of a lockup clutch are output in the second embodiment.

As shown in FIG. 12, when time TI has elapsed since the damping control was interrupted, a shift command unit 9122 outputs the signal for commanding shift to ECT system 9300. Therefore, shift control unit 9302 of ECT system 9300 controls automatic transmission 2000 to delay the start of the shift until the actual engine torque stabilizes after the damping control is interrupted.

In the present embodiment, the engagement force of the friction engagement elements during the shift and the manner of change thereof are controlled in accordance with target engine torque TB set in consideration of the demand drive force or the like demanded by the control systems other than damping control system 9030.

Furthermore, when it is determined to perform the shift of automatic transmission 2000, a lockup determining unit 9124 of power train manager 9100 determines to bring lockup clutch 2106 from the engaged state to the disengaged state. Therefore, determination to perform the shift of automatic transmission 2000 means determination to bring lockup clutch 2106 from the engaged state to the disengaged state.

As shown in FIG. 12, when time TI has elapsed since the damping control was interrupted, a lockup command unit 9126 of power train manager 9100 outputs a signal for commanding disengagement of lockup clutch 2106 to ECT system 9300.

Upon receiving the signal for commanding disengagement of lockup clutch 2106 from lockup command unit 9126, a lockup control unit 9304 of ECT system 9300 starts disengagement of lockup clutch 2106.

Therefore, lockup control unit 9304 of ECT system 9300 controls lockup clutch 2106 to delay the start of disengagement until the actual engine torque stabilizes after the damping control is interrupted.

Figure 13:
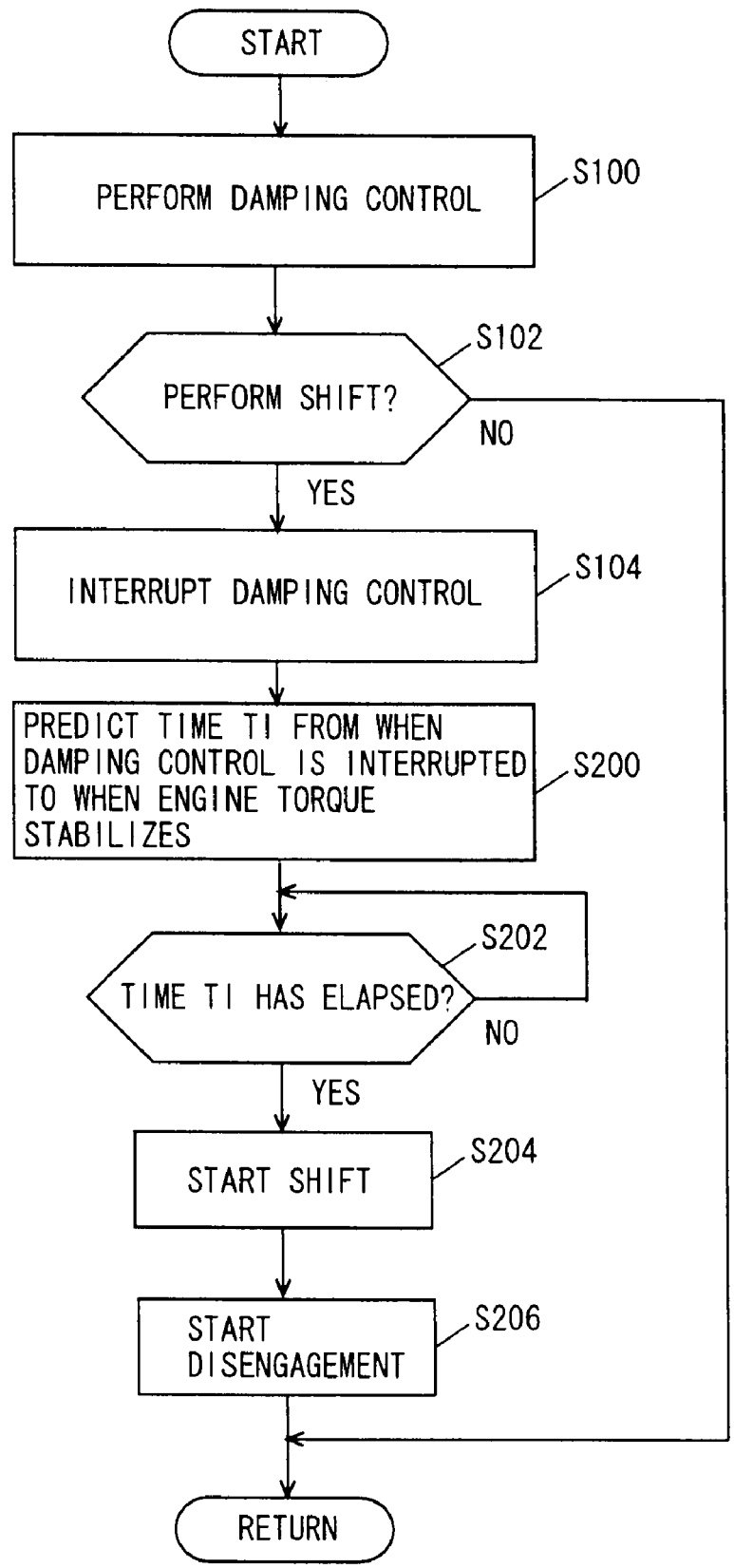
FIG. 13 is a diagram showing a control structure of a program executed by the ECU in the second embodiment.

With reference to FIG. 13, a control structure of a program executed by ECU 8000 in the present embodiment will be described. It should be noted that the same step number is given to the same processing as the processing in the above-described first embodiment, and thus, detailed description thereof will not be repeated here.

In S200, ECU 8000 predicts a time when the actual engine torque stabilizes after the damping control is interrupted, that is, time TI from when the damping control is interrupted to when the actual engine torque stabilizes.

In S202, ECU 8000 determines whether or not time TI has elapsed since the damping control was interrupted. If time TI has elapsed (YES in S202), the processing proceeds to S204. If not (NO in S202), the processing returns to S202.

In S204, ECU 8000 starts the shift of automatic transmission 2000. In S206, ECU 8000 starts disengagement of lockup clutch 2106.

The operation of the control system in the present embodiment based on the above structure and flowchart will be described.

When the damping control is interrupted (S104), the time when the actual engine torque stabilizes after the damping control is interrupted, that is, time TI from when the damping control is interrupted to when the actual engine torque stabilizes is predicted (S200).

When time TI has elapsed since the damping control was interrupted (YES in S202), the shift of automatic transmission 2000 starts (S204). In addition, disengagement of lockup clutch 2106 starts (S206).

As a result, an amount of fluctuations in the actual engine torque during the shift of automatic transmission 2000 and during transition of lockup clutch 2106 from the engaged state to the disengaged state can be decreased. Therefore, automatic transmission 2000 and torque converter 2100 constituting the powertrain can be controlled in accordance with the actual engine torque.

Third Embodiment

A third embodiment will be described hereinafter. The present embodiment is different from the above-described first embodiment in that in the case where the engine torque stabilizes within a maximum delay time TIMAX after the damping control is interrupted. control is performed to delay the start of the shift of automatic transmission 2000 until the engine torque stabilizes after the damping control is interrupted. In addition, the present embodiment is different from the above-described first embodiment in that in the case where the engine torque does not stabilize within maximum delay time TIMAX after the damping control is interrupted, control is performed to delay the start of the shift of automatic transmission 2000 until maximum delay time TIMAX elapses since the damping control is interrupted, and the engagement force of the friction engagement elements during the shift of automatic transmission 2000 is controlled in accordance with the predicted magnitude of the engine torque.

The remaining configuration is the same as that of the above-described first embodiment, and thus, detailed description thereof will not be repeated here.

Figure 14:
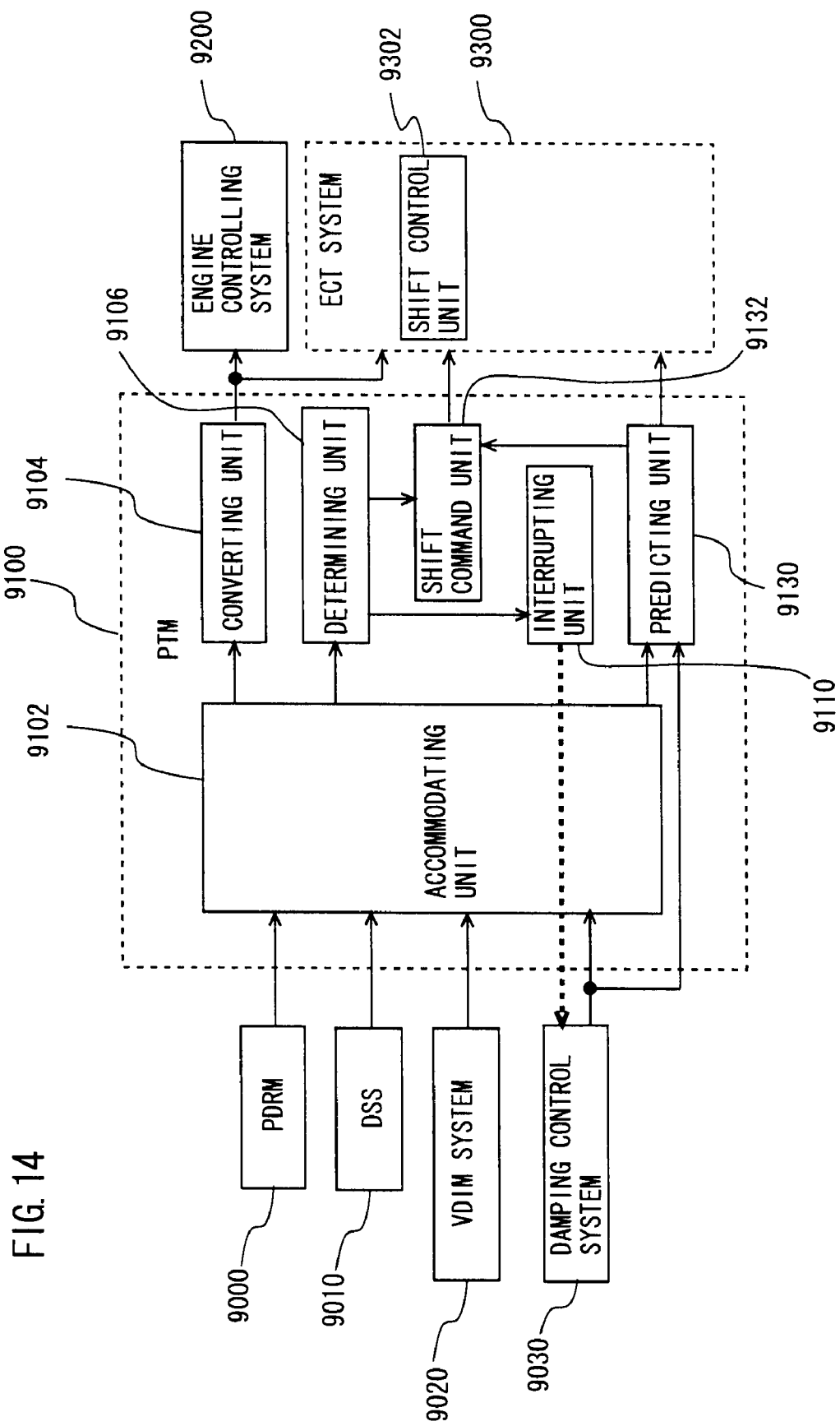
FIG. 14 is a diagram showing a configuration of a control system in a third embodiment.

Referring to FIG. 14, a predicting unit 9130 of power train manager 9100 predicts a time when the engine torque stabilizes, the magnitude of the engine torque and the manner of change thereof, as the behavior of the engine torque after the damping control is interrupted.

More specifically, predicting unit 9130 of power train manager 9100 predicts the time when the actual engine torque stabilizes after the damping control is interrupted, based on the amplitude and the phase of the target engine torque controlled by the damping control at the time of interrupting the damping control. In other words, time TI from when the damping control is interrupted to when the actual engine torque stabilizes is predicted.

Furthermore, predicting unit 9130 predicts the magnitude of the engine torque from when the damping control is interrupted to when the actual engine torque stabilizes as well as the manner of change thereof, based on the amplitude and the phase of the target engine torque controlled by the damping control at the time of interrupting the damping control.

Figure 15:
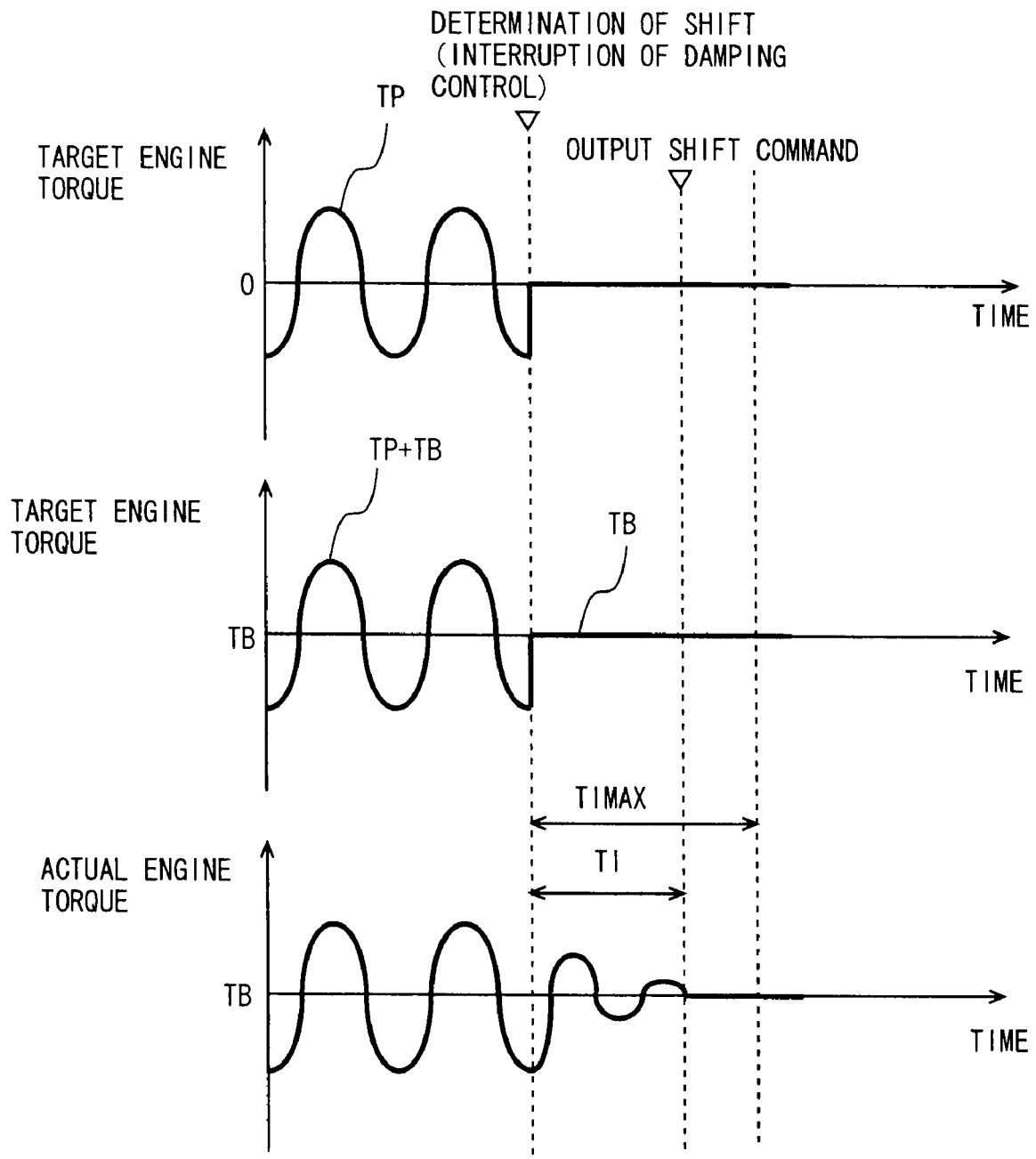
FIG. 15 is a diagram (No. 1) showing a time when the signal for commanding shift is output in the third embodiment.

In the present embodiment, as shown in FIG. 15, in the case where the engine torque stabilizes within maximum delay time TIMAX after the damping control is interrupted, a shift command unit 9132 outputs the signal for commanding shift to ECT system 9300, when time TI has elapsed since the damping control was interrupted.

Therefore, in the case where the engine torque stabilizes within maximum delay time TIMAX after the damping control is interrupted, shift control unit 9302 of ECT system 9300 controls automatic transmission 2000 to delay the start of the shift until the engine torque stabilizes after the damping control is interrupted.

In this case, the engagement force of the friction engagement elements during the shift and the manner of change thereof are controlled in accordance with target engine torque TB set in consideration of the demand drive force or the like demanded by the control systems other than damping control system 9030.

Figure 16:
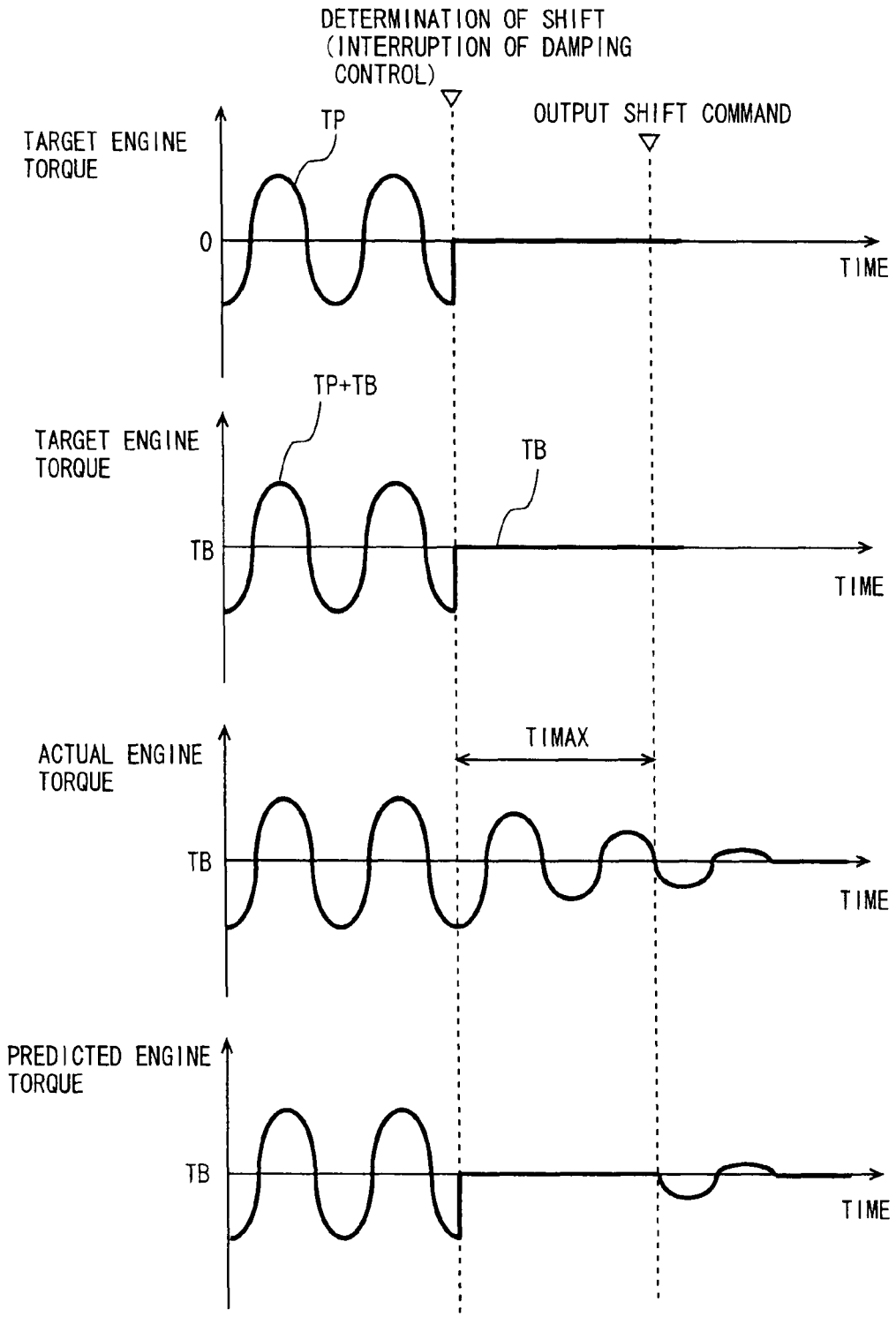
FIG. 16 is a diagram (No. 2) showing a time when the signal for commanding shift is output in the third embodiment.

In addition, as shown in FIG. 16, in the case where the engine torque does not stabilize within maximum delay time TIMAX after the damping control is interrupted, shift command unit 9132 outputs the signal for commanding shift to ECT system 9300, when maximum delay time TIMAX has elapsed since the damping control was interrupted.

Therefore, in the case where the engine torque does not stabilize within maximum delay time TIMAX after the damping control is interrupted, shift control unit 9302 of ECT system 9300 controls automatic transmission 2000 to delay the start of the shift until maximum delay time TIMAX elapses since the damping control is interrupted.

In this case, shift control unit 9302 of ECT system 9300 controls the transient engagement force of the friction engagement elements (clutches and brakes) during the shift of automatic transmission 2000 in accordance with the predicted magnitude of the engine torque, after maximum delay time TIMAX elapses.

Figure 17:
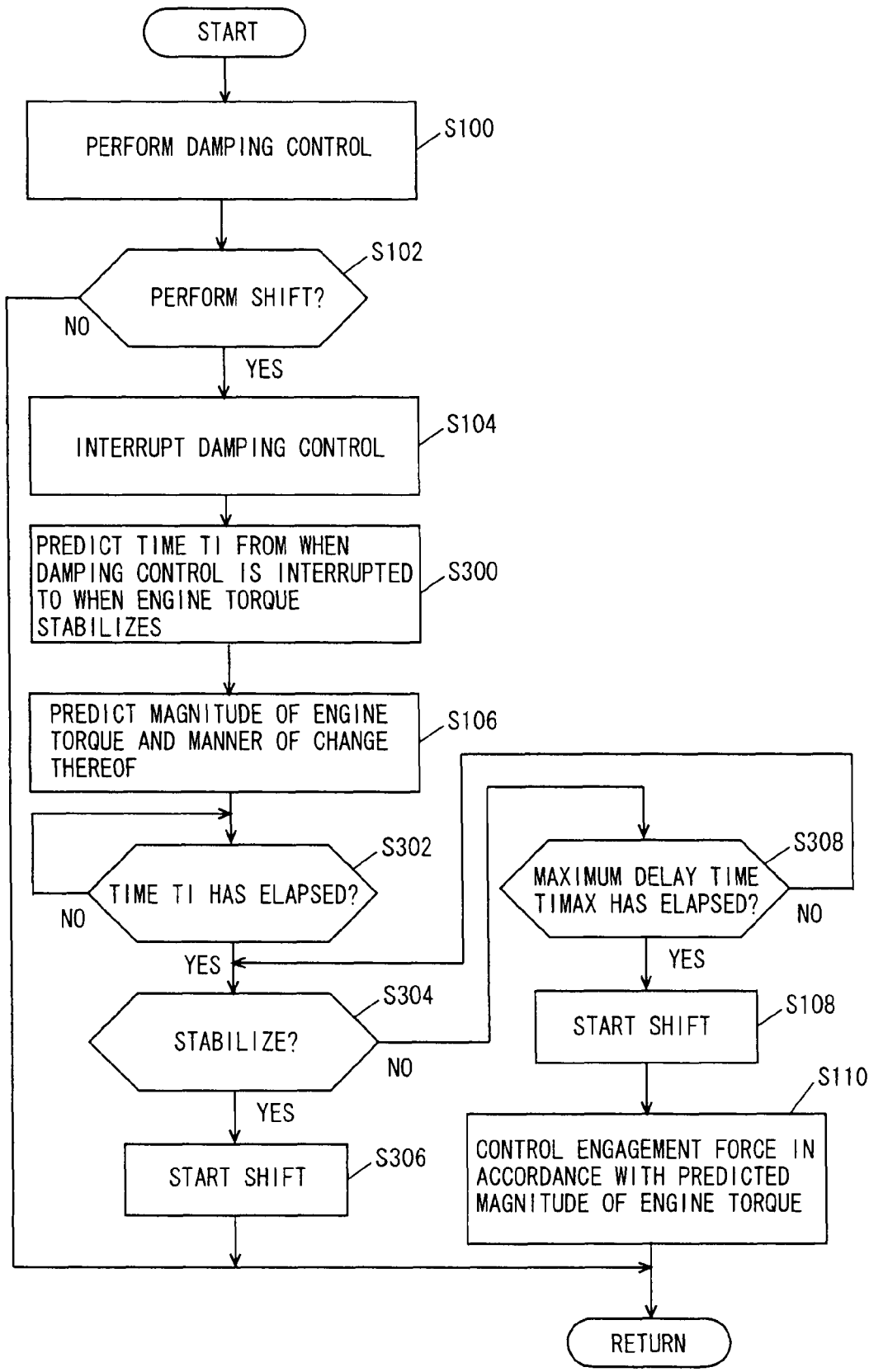
FIG. 17 is a diagram showing a control structure of a program executed by the ECU in the third embodiment.

With reference to FIG. 17, a control structure of a program executed by ECU 8000 in the present embodiment will be described. It should be noted that the same step number is given to the same processing as the processing in the above-described first embodiment, and thus, detailed description thereof will not be repeated here.

In S300, ECU 8000 predicts a time when the actual engine torque stabilizes after the damping control is interrupted, that is, time TI from when the damping control is interrupted to when the actual engine torque stabilizes.

In S302, ECU 8000 determines whether or not time TI has elapsed since the damping control was interrupted. If time TI has elapsed (YES in S302), the processing proceeds to S304. If not (NO in S302), the processing returns to S302.

In S304, ECU 8000 determines whether or not the actual engine torque has stabilized. For example, when an amount of fluctuations in engine rotation speed NE within a predetermined time period is equal to or smaller than a threshold value, it is determined that the engine torque has stabilized. It should be noted that a method of determining whether or not the engine torque has stabilized is not limited thereto.

If the engine torque has stabilized (YES in S304), the processing proceeds to S306. If not (NO in S304), the processing proceeds to S308.

In S306, ECU 8000 starts the shift of automatic transmission 2000.

In S308, ECU 8000 determines whether or not maximum delay time TIMAX has elapsed since the damping control was interrupted. If maximum delay time TIMAX has elapsed (YES in S308), the processing proceeds to S108. If not (NO in S308), the processing returns to S304.

The operation of the control system in the present embodiment based on the above structure and flowchart will be described.

When the damping control is interrupted (S104), the time when the actual engine torque stabilizes after the damping control is interrupted, that is, time TI from when the damping control is interrupted to when the actual engine torque stabilizes is predicted (S300). Furthermore. the behavior of the engine torque from when the damping control is interrupted to when the actual engine torque stabilizes is predicted (S106).

When time TI has elapsed since the damping control was interrupted (YES in S302), it is determined whether or not the actual engine torque has stabilized (S304). When the actual engine torque has stabilized (YES in S304), the shift of automatic transmission 2000 starts (S306).

As a result, the amount of fluctuations in the actual engine torque during the shift of automatic transmission 2000 can be decreased. Therefore, automatic transmission 2000 constituting the powertrain can be controlled in accordance with the actual engine torque.

Even if the actual engine torque does not stabilize (NO in S304), the shift of automatic transmission 2000 starts (S108) when maximum delay time TIMAX has elapsed since the damping control was interrupted (YES in S308). As a result, a time period during which the shift is delayed can be restricted.

During the shift, the transient engagement force of the friction engagement elements (clutches and brakes) during the shift of automatic transmission 2000 is controlled in accordance with the predicted magnitude of the engine torque (S110).

As a result, the engagement force of the friction engagement elements during the shift can be controlled using torque having a small difference from the actual engine torque. Therefore, the engagement force of the friction engagement force can be neither overmuch nor insufficient with respect to the actual engine torque, that is, torque actually inputted to automatic transmission 2000. Consequently, the automatic transmission constituting the powertrain can be controlled in accordance with the actual engine torque.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

Reference Signs List

1000 engine; 1004 auxiliary machine; 2000 automatic transmission; 2100 torque converter; 2102 input shaft; 2104 output shaft; 2106 lockup clutch; 5000 propeller shaft; 6000 differential gear; 7000 rear wheel; 8000 ECU; 8002 ROM; 8004 shift lever; 8006 position switch; 8008 accelerator pedal; 8010 accelerator pedal position sensor; 8012 air flow meter; 8016 electronic throttle valve; 8018 throttle opening position sensor; 8020 engine rotation speed sensor; 8022 input shaft rotation speed sensor; 8024 output shaft rotation speed sensor; 8026 oil temperature sensor; 8028 water temperature sensor; 8030 vehicle speed sensor; 9000 power train driver model; 9010 drivers support system; 9020 VDIM system; 9030 damping control system; 9100 power train manager; 9102 accommodating unit; 9104 converting unit; 9106 determining unit; 9108, 9122, 9132 shift command unit; 9110 interrupting unit; 9112, 9120, 9130 predicting unit; 9124 lockup determining unit; 9126 lockup command unit; 9200 engine controlling system; 9300 ECT system; 9302 shift control unit; 9304 lockup control

The invention claimed is:

1. A vehicle, comprising:
   a driving source;
   a transmission coupled to said driving source and capable of changing a gear ratio by shift; and
   a control apparatus, wherein
   said transmission performs the shift by changing a friction engagement element to be in an engaged state, and
   said control apparatus is configured to:
   perform damping control by which said driving source is controlled to output torque for reducing up-and-down vibrations of the vehicle,
   determine whether or not to perform the shift of said transmission,
   interrupt said damping control when determining to perform the shift of said transmission,
   predict a time when the output torque of said driving source stabilizes after said damping control is interrupted and magnitude of the output torque of said driving source from when said damping control is interrupted to when the output torque of said driving source stabilizes,
   control said transmission to delay a start of the shift until the output torque of said driving source stabilizes after said damping control is interrupted, in a case where the output torque of said driving source stabilizes within a predetermined time period after said damping control is interrupted, and
   control said transmission to delay the start of the shift until said predetermined time period elapses since said damping control is interrupted, and controls engagement force of said friction engagement element during the shift of said transmission in accordance with the predicted magnitude of the output torque of said driving source, in a case where the output torque of said driving source does not stabilize within said predetermined time period after said damping control is interrupted.

2. The vehicle according to claim 1, wherein
   said control apparatus is configured to predict the time when the output torque of said driving source stabilizes after said damping control is interrupted and the magnitude of the output torque of said driving source from when said damping control is interrupted to when the output torque of said driving source stabilizes, based on an amplitude and a phase of the output torque of said driving source controlled by said damping control at the time of interrupting said damping control.

3. A control apparatus for a vehicle equipped with a driving source and a transmission coupled to said driving source and capable of changing a gear ratio by shift, said transmission performing the shift by changing a friction engagement element to be in an engaged state, and said control apparatus comprising:
   damping control means for performing damping control by which said driving source is controlled to output torque for reducing up-and-down vibrations of the vehicle;
   means for determining whether or not to perform the shift of said transmission;
   interrupting means for interrupting said damping control when determining to perform the shift of said transmission;
   predicting means for predicting a time when the output torque of said driving source stabilizes after said damping control is interrupted and magnitude of the output torque of said driving source from when said damping control is interrupted to when the output torque of said driving source stabilizes; and
   shift control means for controlling said transmission to delay a start of the shift until the output torque of said driving source stabilizes after said damping control is interrupted, in a case where the output torque of said driving source stabilizes within a predetermined time period after said damping control is interrupted, and controlling said transmission to delay the start of the shift until said predetermined time period elapses since said damping control is interrupted, and controlling engagement force of said friction engagement element during the shift of said transmission in accordance with the predicted magnitude of the output torque of said driving source, in a case where the output torque of said driving source does not stabilize within said predetermined time period after said damping control is interrupted.

* * * * *